Patented July 5, 1949

2,475,234

UNITED STATES PATENT OFFICE 2,475,234

POLYMERIZATION OF CYCLIC DIMER OF BUTADIENE-1,3 OR PIPERYLENE

Anthony H. Gleason and Byron M. Vanderbilt, Westfield, N. J., assignors to Standard Oil Development Company, a corporation of Delaware No Drawing. Application October 26, 1946, Serial No. 706,050

11 Claims. (Cl. 260—45.5)

This invention pertains to certain oily or soluble thermoplastic solids and to a method of producing them.

It has been disclosed in application Serial No. 638,589, filed December 31, 1945, that cyclic diolefins having a water-like consistency obtained by dimerizing butadiene-1,3 or piperylene, can be further polymerized to form oils of high viscosity at ordinary temperatures or soluble, thermoplastic resins of low impact strength by mere heating of these cyclic diolefins or dimers under their own vapor pressure and in the absence of air for from about 10 hours to several days at temperatures of 250–400° C., preferably at temperatures between 290 and 330° C. This polymerization normally proceeds in such a manner that the crude resin or polymerization product obtained in 20–40 hours contains an undesirably large proportion of oily polymers. The latter reduce the melting point of the resin, making it too soft to handle at ordinary temperatures, and generally have to be extracted, thus raising the cost of the finished resin, due to the added operation and equipment necessary to carry out this extraction, and to the losses of material in the extraction.

We have now found that the softening or melting point of the crude resin obtained by thermal treatment of the cyclic dimers of butadiene-1,3 and piperylene can be raised to such an extent that the resins can be handled and shipped satisfactorily if less than about 20%, preferably from 3 to 18%, of a linear-type hydrocarbon polymer, preferably polybutadiene, are added to the monomer or dimer feed stock. The linear-type hydrocarbon polymers which may be used as additives in accordance with the present invention may be prepared in known manner by mass, emulsion or sodium polymerization techniques. Suitable polymers for our purpose include polybutadiene, polypiperylene and also copolymers of a major proportion of a conjugated diolefin and a minor proportion of a hydrocarbon comonomer such as butadiene-styrene, butadiene-isobutylene and the like.

The linear-type hydrocarbon polymers which are used as additives are oily or rubbery in nature, but never brittle at ordinary temperatures, i. e., at 20–30° C., (and therefore referred to hereinafter simply as "non-brittle" polymers) and preferably have molecular weights within the range of 1,000–25,000 to facilitate solution in the feed stock, although those of higher molecular weight, i. e. of 75,000–100,000, may also be used. While it is known that rubbery polybutadienes are gradually depolymerized at the temperatures employed for the polymerization of butadiene and piperylene dimers to resins, i. e., 250–400° C., the fission products are still of a sufficiently high molecular weight and functionality to provide the impetus needed in the reaction system for obtaining a resin of the desired hardness without an extraction of the reaction product.

The following examples are illustrative of the present invention.

Example 1

In a run representative of the prior art, 820 g. of freshly distilled vinyl cyclohexene-3 were charged to a 1.8 l. stainless-steel bomb and heated for 40 hours at 315° C. without agitation. The bomb was discharged at 140° C. giving 815 g. of a light, amber colored oil which, on cooling to room temperature, consisted of a soft resin, slightly tacky to the touch, and having a softening point by the ball and ring method of 65.5° C. This material was subject to cold flow and could not be handled as a dry powder. Repeated extraction of this soft resin with hot methyl ethyl ketone removed the oily fractions and gave 623 g. (76%) of a brittle resin having a softening point of 104° C.

In accordance with the instant invention 4% by weight of a polybutadiene rubber having an approximate molecular weight of 70,000 and prepared by means of metallic sodium as catalyst was added to a batch of freshly distilled vinyl cyclohexene-3, also referred to as butadiene dimer. The rubbery polymer was completely dissolved in the butadiene dimer by slow agitation of the mixture for several hours. Heating the blend for 40 hours at 315° C. produced a light colored resin in quantitative yield, which had a softening point by the ball and ring method of 93.5° C. This shows that the addition of a very small quantity of a rubbery, linear polymer of butadiene resulted in the direct formation of a resin having a softening point almost thirty degrees higher than was obtained without that addition, and within eleven degrees of the softening point of the resin obtainable by extraction.

Example 2

Butadiene may be polymerized in the presence of mono-olefins such as butene-2 and other modifiers to form oily polymers by means of metallic sodium as a catalyst. From their intrinsic viscosities these oily polymers have been found to possess average molecular weights of 5,000–10,000. The addition of 10% by weight of such an oily polymer having an intrinsic viscosity of 0.125 to vinyl cyclohexene prior to the heat treatment outlined in Example 1 resulted in the formation of a quantitative yield of a brittle resin having a softening point by the ball and ring method of 97.5° C. without resorting to extraction. The resin was soluble in linseed oil and dehydrated castor oil, such mixtures forming superior varnishes when cooked in the customary manner.

Example 3

When 20% by weight of the polymer oil mentioned in Example 2 was added to vinyl cyclohexene before the resinification process, a product was obtained which could not be poured from the reactor even at reaction temperatures (250–350° C.). Gelation had occurred and the crude product was substantially insoluble in drying oils and other organic solvents.

Example 4

Vinyl cyclohexene containing 17.5% by weight of a soluble, rubbery polymer obtained by the bulk polymerization of butadiene at elevated temperatures was heated at 315° C. for 40 hours in the usual manner to produce a soluble, brittle resin. The ball and ring softening point was 98° C. without subjecting it to solvent extraction.

The foregoing description contains a limited number of embodiments of the present invention. It will be understood, however, that our invention is not limited to the specific conditions disclosed since numerous variations are possible without departing from the scope of the following claims.

What we claim and desire to secure by Letters Patent is:

1. In the process of preparing resinous polymerization products by the heating of a member of the group consisting of the cyclic dimer of butadiene-1,3 and the cyclic dimer of piperylene, the improvement which comprises heating the dimer at a temperature between 250 and 400° C. in the presence of less than about 20 percent of an oily to rubbery, non-brittle linear-type hydrocarbon polymer of 1000 to about 100,000 molecular weight until a major proportion of the dimer is converted to a resinous product, the non-brittle hydrocarbon polymer being selected from the group consisting of homopolymers of butadiene, homopolymers of piperylene and copolymers of a major proportion of butadiene and a minor proportion of a hydrocarbon comonomer.

2. The process of preparing resinous polymerization products which comprises adding 3 to 18 wt. per cent of a non-brittle linear-type hydrocarbon polymer of 1,000 to 100,000 molecular weight and selected from the group consisting of homopolymers of butadiene, homopolymers of piperylene and of copolymers of a major proportion of butadiene and a minor proportion of a hydrocarbon comonomer to a member of the group consisting of the cyclic dimer of butadiene-1,3 and the cyclic dimer of piperylene and heating the resultant mixture to 250–400° C. until a major proportion of the dimer is converted to a resinous polymerization product.

3. The process of preparing resinous polymerization products which comprises adding 3 to 18 wt. per cent of an oily to rubbery, non-brittle, linear-type hydrocarbon polymer of 1,000 to 100,000 molecular weight and selected from the group consisting of homopolymers of butadiene, homopolymers of piperylene and of copolymers of a major proportion of butadiene and a minor proportion of a hydrocarbon comonomer to 1 vinyl-3-cyclohexene and heating the resultant mixture to 250–400° C. until a major proportion of the vinyl cyclohexene is converted to a resinous polymerization product.

4. The process of preparing resinous polymerization products which comprises adding 3 to 18 wt. per cent of an oily to rubbery, non-brittle, linear-type hydrocarbon polymer of 1,000 to 100,000 molecular weight and selected from the group consisting of homopolymers of butadiene, homopolymers of piperylene and of copolymers of a major proportion of butadiene and a minor proportion of a hydrocarbon comonomer to the cyclic dimer of piperylene and heating the resultant mixture to 250–400° C. until a major proportion of the dimer is converted to a resinous polymerization product.

5. The process of preparing resinous polymerization products which comprises adding from 3 to 18 wt. per cent of an oily to rubbery, non-brittle, linear-type butadiene homopolymer of 1,000 to 100,000 molecular weight to a member of the group consisting of the cyclic dimer of butadiene-1,3 and the cyclic dimer of piperylene and heating the resultant mixture to 290–330° C. until a major proportion of the dimer is converted to a resinous polymerization product.

6. The process of preparing resinous polymerization products which comprises adding from 3 to 18 wt. per cent of an oily to rubbery, non-brittle, linear-type butadiene homopolymer of 1,000 to 100,000 molecular weight to 1 vinyl-3-cyclohexene and heating the resultant mixture to 290–330° C. until a major proportion of the vinyl cyclohexene is converted to a resinous polymerization product.

7. The process of preparing resinous polymerization products which comprises adding from 3 to 18 wt. per cent of an oily to rubbery, non-brittle, linear-type piperylene homopolymer of 1,000 to 100,000 molecular weight to the cyclic dimer of piperylene and heating the resultant mixture to 250–400° C. until a major proportion of the dimer is converted to a resinous polymerization product.

8. The process of preparing resinous polymerization products which comprises adding 3 to 18 wt. per cent of an oily linear-type butadiene homopolymer of 1,000 to 25,000 molecular weight to butadiene-1,3, heating the resultant mixture at a temperature below 200° C. until a major proportion of the butadiene is converted to a cyclic dimer, raising the temperature of the reaction mixture to 250–400° C. and maintaining the temperature at this level until a major proportion of the dimer is converted to a resinous polymerization product.

9. Resinous polymerization products produced by the process of claim 6.

10. Resinous polymerization products produced by the process of claim 7.

11. Resinous polymerization products produced by the process of claim 1.

ANTHONY H. GLEASON.
BYRON M. VANDERBILT.

No references cited.